United States Patent
Rouse et al.

[11] B 3,913,589
[45] Oct. 21, 1975

[54] GRAIN PAN BOTTOM DOOR

[75] Inventors: Paul L. Rouse, Moline; Robert L. Francis, East Moline, both of Ill.

[73] Assignee: International Harvester Company, Chicago, Ill.

[22] Filed: Feb. 8, 1973

[21] Appl. No.: 330,828

[44] Published under the Trial Voluntary Protest Program on January 28, 1975 as document no. B 330,828.

[52] U.S. Cl. .................................. 130/24; 130/26
[51] Int. Cl.² .......................................... A01F 12/30
[58] Field of Search ................................ 130/24, 26

[56] References Cited
UNITED STATES PATENTS

| | | | |
|---|---|---|---|
| 1,682,733 | 9/1928 | Ashton | 130/24 |
| 2,500,803 | 3/1950 | Cockrell | 130/24 |

*Primary Examiner*—Russell R. Kinsey
*Attorney, Agent, or Firm*—F. David AuBuchon; Floyd B. Harman

[57] ABSTRACT

A grain pan assembly for a combine harvester and including a sectional grain pan proper having a fixed rear section and a hinged forward door section capable of being swung out of the general plane of the grain pan to an inclined lowered position where both sections of the grain pan, as well as other adjacent combine instrumentalities, are exposed and accessible for inspection or maintenance. A novel hinge construction at the juncture region between the two sections allows the hinged door section to be freely swung between its raised and lowered positions and also, when desired, to be lifted from its supported relationship relative to the fixed section for complete removal from the combine, thereby establishing an increased working area for grain pan removal or for purposes of repair or replacement.

8 Claims, 10 Drawing Figures

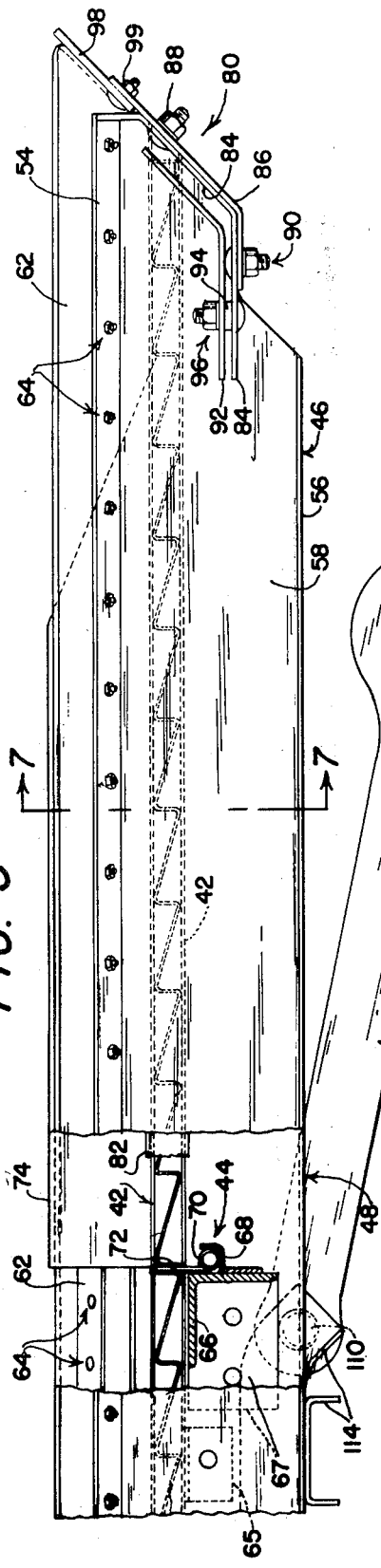
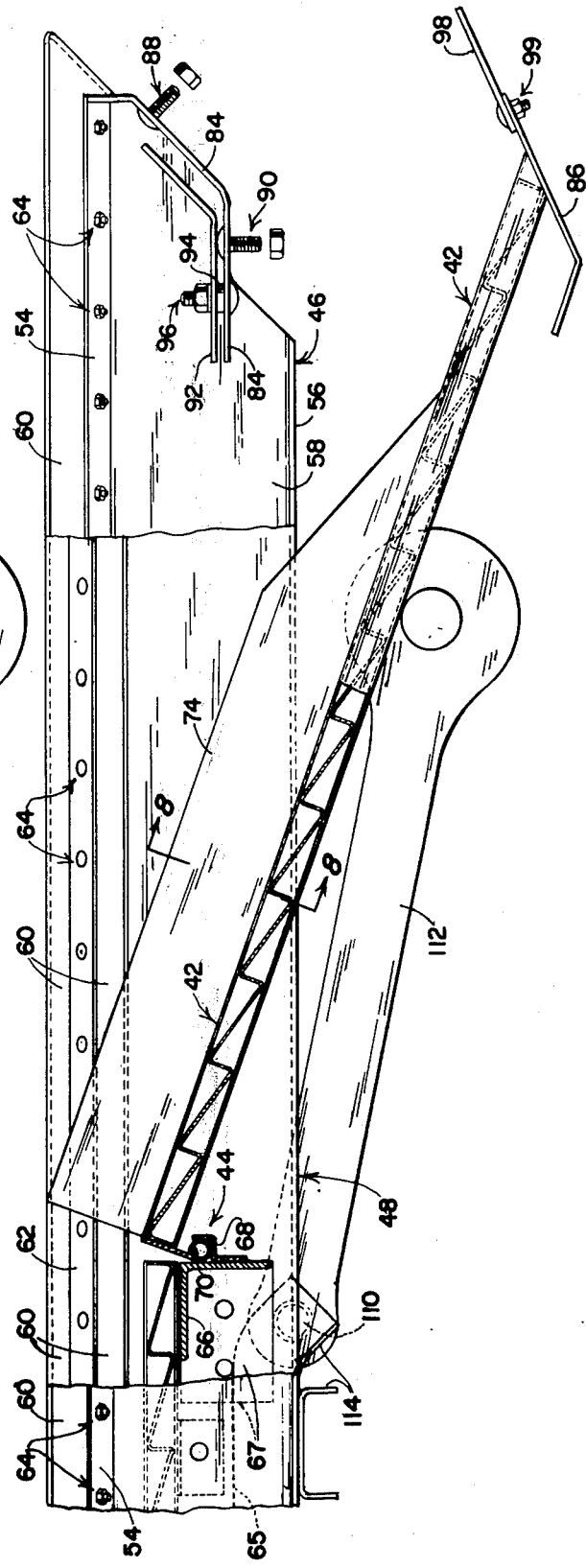
FIG. 5
FIG. 6

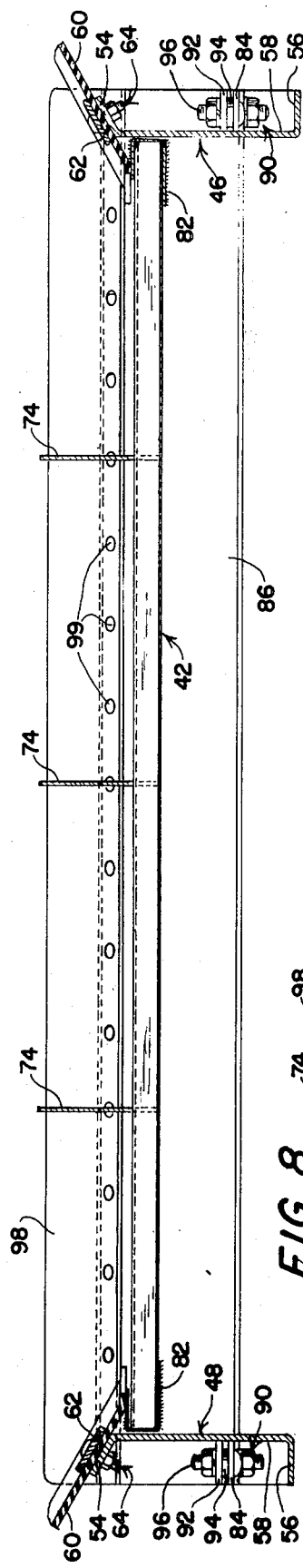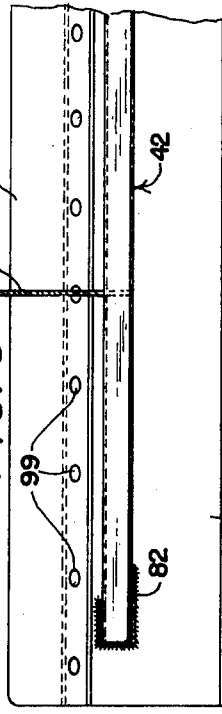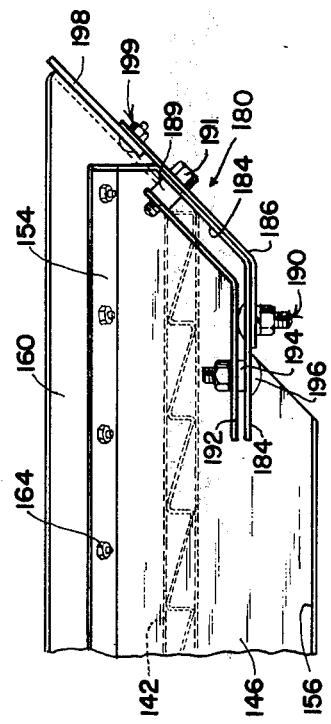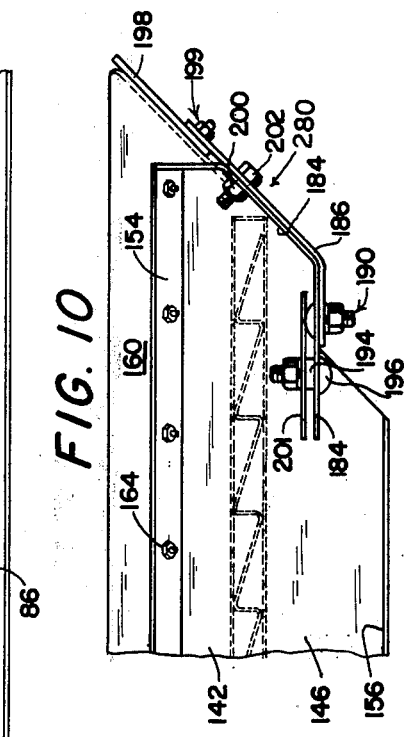

GRAIN PAN BOTTOM DOOR

The present invention relates generally to harvesting machines of the type which is commonly referred to as a combine harvester and has particular reference to a novel grain pan structure for such a harvester and by means of which accessibility to the interior of the combine is enhanced not only for maintenance of the grain pan proper, but also for maintenance of other functional combine instrumentalities in the immediate vicinity of the grain pan.

In a combine harvester of the general type under consideration, the grain pan assembly is disposed in the cleaning area of the machine and it functions to receive grain, together with some impurities such as straw, which is discharged by the threshing drum for the purpose of separating out the grain and delivering it to an associated chaffer sieve where further and final cleaning operations are conducted on the grain. Such a grain pan structure immediately underlies the threshing drum concave and, when the grain pan proper, which commonly is referred to as the grain pan bottom, is in its operatively installed position within the combine, access to either the concave or the grain pan for purposes of inspection, cleaning or repair is not readily available. Thus, in order to perform these functions it is necessary to partially disassemble the grain pan structure and remove the entire grain pan proper. This involves an appreciable amount of manual labor including the unfastening of a large number of bolting or other clamping devices and the subsequent replacement thereof.

The present invention is designed to overcome the above-noted limitation that is attendant upon the construction and use of conventional grain pan assemblies and, toward this end, the invention contemplates the provision of a novel grain pan assembly which embodies an articulated sectional grain pan proper or bottom, together with a novel association of such an assembly in a combine harvester, whereby limited access to both the grain pan and the adjacent concave may be had by the simple expedient of displacing one of the grain pan sections to an out-of-the-way position. For a more complete access to the grain and its associated adjacent concave, means are provided whereby the displaced grain pan section may, without the use of tools or further attention of any sort, be lifted bodily from its displaced position and thus removed from the combine, thereby affording substantially unobstructed access to the concave, as well as to the remaining section of the grain pan proper.

In attaining these ends the invention does not depart appreciably from the use of the usual or conventional grain pan supporting structure, nor does it necessitate any appreciable modifications or alterations to the harvester framework or functional equipment associated therewith other than the grain pan structure itself. The use of the usual elongated parallel grain pan side rails is preserved, but these are modified to a slight degree to accommodate the novel articulated sectional grain pan proper or grain pan bottom which, for convenience of description herein, will hereinafter be referred to simply as the grain pan. More specifically, in carrying out the invention, this grain pan is of two-piece construction and consists of a fixed rear section and a movable forward door section which is hingedly connected in edge-to-edge relationship to the forward edge of the fixed rear section. The forward section is movable between an operative raised position wherein it lies in the general plane of the rear section so that, in effect, it constitutes an extension or continuation of such rear section, and a lowered inclined out-of-the-way position. When the forward section is in its operative raised position, the grain pan as a whole is commensurate dimensionally with the dimensions of a conventional grain pan and, also, it does not deviate positionally from the disposition of a conventional grain pan within the cleaning area of the harvester. Likewise, it is functionally the equivalent of a conventional grain pan.

In connection with a conventional grain pan, the forward end thereof normally obstructs the space which leads to the interior of the harvester chassis or body and particularly the space which exists between the harvester concave and the upper surface of the grain pan. Thus, with a conventional grain pan assembly when the grain pan is in its operative installed position neither the concave nor the grain pan is accessible for purposes of inspection, cleaning or repair and it becomes necessary to remove the grain pan bodily from the harvester in order that the aforementioned space beneath the harvester concave may afford access to the latter. Due to the large number of fastening bolts and other clamping devices which must be removed to effect grain pan removal, the operation usually is considered one for the shop rather than for the field. However, according to the present invention, the forward section of the grain pan is held in its raised position by a relatively simple clamping arrangement which, when loosened, allows the section to be lowered to an inclined supported position wherein access is readily available thereto for cleaning purposes, as well as to the fixed section and also the concave.

A further salient feature of the invention resides in the provision of a novel "open top" hinge connection between the movable forward grain pan section and the fixed rear section, the connection allowing the forward section to be lifted bodily from its supported inclined position and thus removed from the machine for purposes of repair, and also for affording wider access to the harvester concave when desired.

Several forms of fastening means for releasably maintaining the movable front grain pan section in its operative raised position are disclosed herein, each of them being of relatively simple construction and therefore being easily manipulated with a minimum of effort.

The provision of a grain pan assembly such as has been briefly outlined above and possessing the stated advantages constitutes the principal object of the present invention.

Other objects and advantages of the invention, not at this time enumerated, will readily suggest themselves as the following description ensues.

In the accompanying four sheets of drawings forming a part of this specification, two illustrative embodiments of the invention have been shown.

In these drawings:

FIG. 5 is an enlarged fragmentary side elevational view of a front portion of the structure shown in FIG. 2, the view being taken on the vertical plane indicated by the line 5—5 and in the direction of the arrows with certain parts broken away and with portions of an associated shaker shaft drive mechanism added in the interests of functional clarity;

FIG. 6 is a side elevational view similar to FIG. 5, showing the grain pan in its lowered position;

FIG. 7 is a sectional view taken substantially on the line 7—7 of FIG. 5;

FIG. 8 is an enlarged sectional view taken substantially on the plane represented by the line 8—8 of FIG. 6 and in the direction of the arrows;

FIG. 9 is a fragmentary sectional view taken substantially centrally and longitudinally through the front end region of the movable grain pan section and illustrating a modified form of clamping assembly by means of which such section may be releasably maintained in its raised operative position; and FIG. 10 is a fragmentary sectional view, similar to FIG. 9, illustrating a further modified form of clamping assembly for maintaining the movable grain pan assembly in its raised position.

DESCRIPTION OF THE PREFERRED EMBODIMENTS

Figure 1:
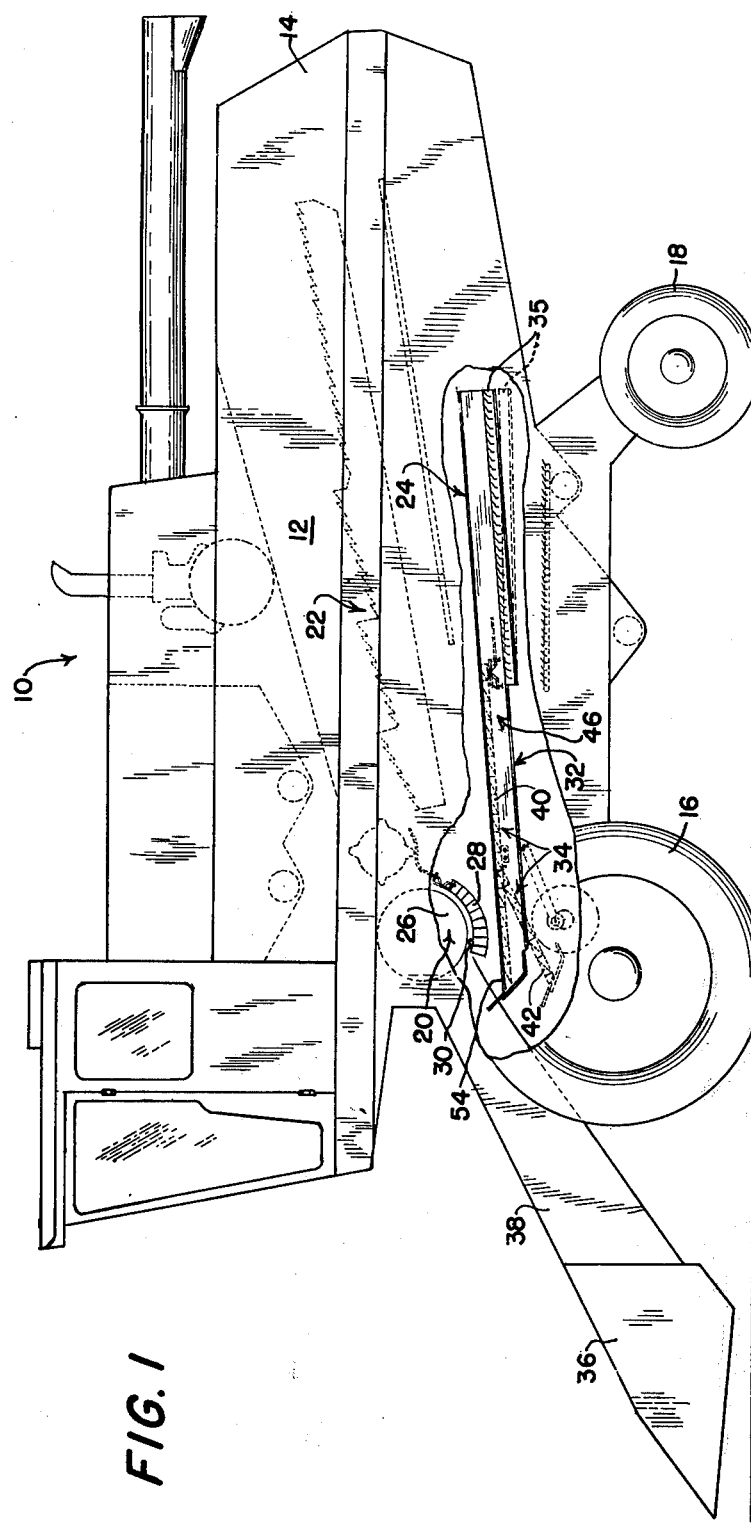
FIG. 1 is a side elevational view, largely schematic in its representation, of a combine harvester having associated therewith a sectional articulated grain pan assembly embodying the present invention.

Referring now to the drawings in detail and in particular to FIG. 1, a combine harvester embodying the present invention is designated in its entirety by the reference numeral 10, the harvester being of more or less conventional construction except for the provision of the novel grain pan assembly of the present invention. The harvester involves in its general organization a housing or body portion 12 having vertical side walls 14, the body portion being tractionally supported by drive wheels 16 and steerable wheels 18. The body portion serves to enclose the grain threshing mechanism 20, the separating mechanism 22 and the cleaning mechanism 24, the latter mechanism embodying the improved grain pan assembly of the present invention as will be described in detail subsequently.

The threshing mechanism includes a threshing drum 26 which is mounted for rotation about a transverse axis of the harvester and cooperates with a concave 28 in the usual manner to define a threshing zone 30 therebetween. A novel grain pan assembly 32 embodying the present invention and which includes a grain pan proper 34 is disposed below the concave 28 and functions substantially in the same manner as a conventional grain pan assembly to collect the grain which passes through the concave and conveys it rearwardly toward the cleaning mechanism 24. This cleaning mechanism is inclusive of the aforementioned grain pan assembly 32 and also embodies a chaffer sieve 35 which is supported from the grain pan assembly. Material such as straw or the like which does not pass through the concave 28 is discharged by the threshing drum 20 to the separating mechanism 22 which removes any remaining grain and deposits the same on the cleaning mechanism, while at the same time discharging the remaining straw to the ground out of the rear of the harvester.

The harvester 10 is fed with unthreshed material which is collected by the crop supply platform 36. This material travels upwardly and rearwardly through the feeder 38 under the influence of an internal conveyor (not shown), the conveyor discharging its contents rearwardly over the rear upper edge of the feeder and into the threshing zone 30.

The general arrangement of parts thus far described is purely conventional and no claim is made herein to any novelty associated with the same, the novelty of the present invention residing rather in the grain pan assembly 32, and especially in the articulated grain pan proper 34 which constitutes the principal functional element of such assembly and which will be fully described hereinafter and subsequently claimed.

Figure 2:
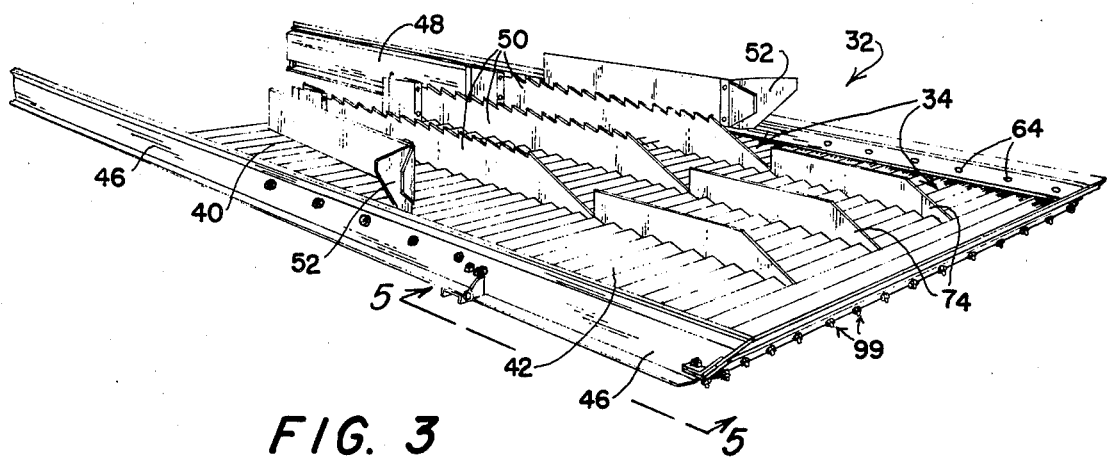
FIG. 2 is a front perspective view of the grain pan assembly and showing the same in its operative or functional condition.
Figure 3:
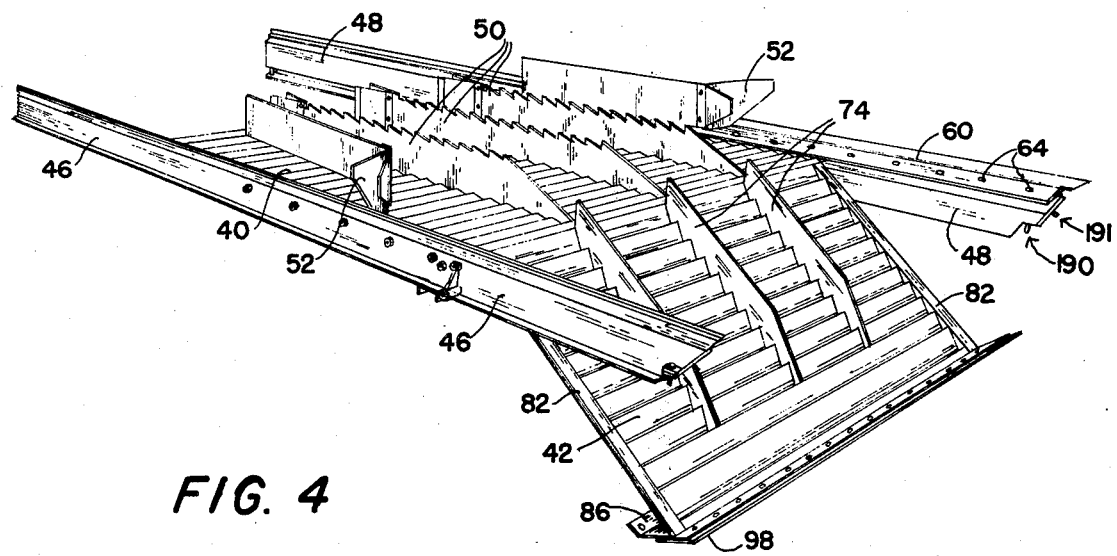
FIG. 3 is a front perspective view, similar to FIG. 1, showing the forward grain pan section in an inclined lowered position by means of which access to the interior of the combine harvester is made available.
Figure 4:
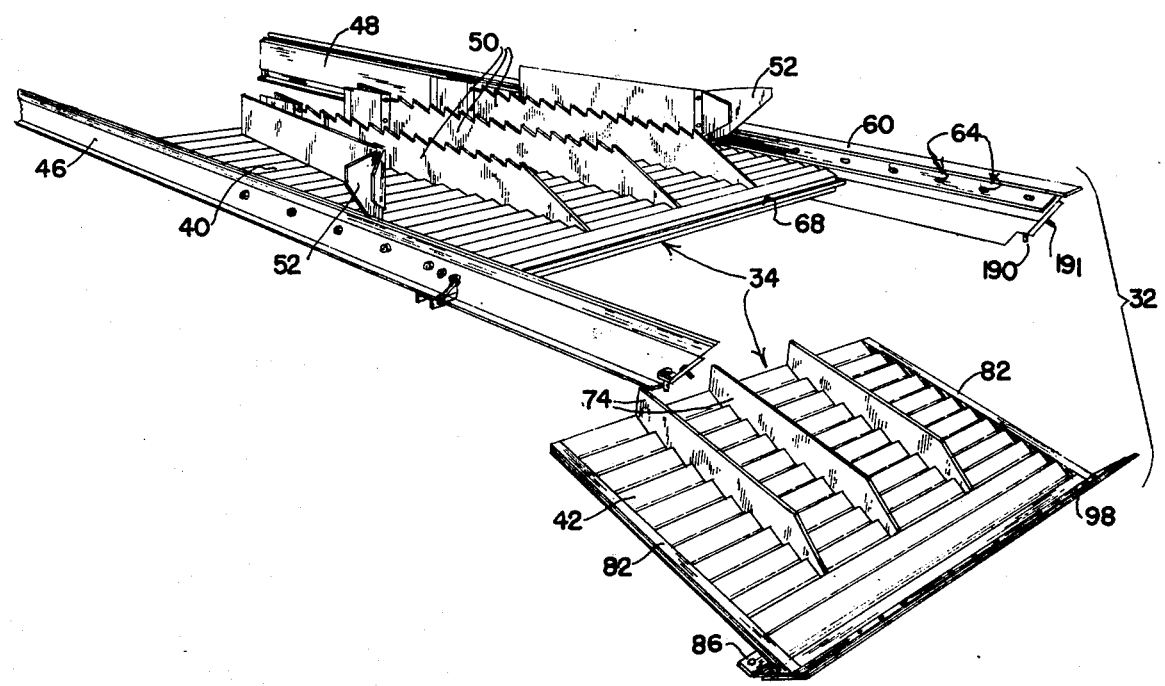
FIG. 4 is an exploded perspective view similar to FIGS. 1 and 2, showing the forward grain pan section removed from the rear fixed section.

Referring now, additionally, to FIGS. 2, 3 and 4, the grain pan assembly 32 is of shallow tray-like design and it includes the aforementioned grain pan proper 34 which is of two-part separable articulated construction and which commonly is referred to as the grain pan bottom but which, as heretofore stated, will be referred to herein simply as the grain pan. This grain pan is comprised of a fixed rear section 40 and a movable front section 42, the latter being hingedly and removably connected to the fixed section 40 in edge-to-edge relationship by means of a hinge assembly 44 (FIGS. 5 and 6) in a manner and for a purpose that will be made clear presently. Briefly, however, and for the present, it is deemed sufficient to state that the grain pan section 42 is movable between the raised, normally operative position in which it is shown in full lines in FIG. 1 and the lower inclined position in which it is shown in dotted lines. In the raised position of the grain pan section 42, the entire grain pan, considered as a whole, corresponds dimensionally, positionally and functionally to a conventional one-piece grain pan and, therefore, it will be noted that in the full line position of FIG. 1, the grain pan section 42 lies in the general plane of the section 40 and in such position it substantially precludes access to the interior of the body portion 12 through the front side thereof and, more particularly, it substantially conceals the concave 28 so that, in the event that it is desired to service the concave of a combine harvester having a conventional grain pan, it is necessary to remove the latter from the machine in order to thus gain access to the concave. To obviate this difficulty, according to the present invention, the front section 42 of the grain pan assembly 34 is capable of being lowered to its dotted line position and, in such an out-of-the-way position, the front end of the body portion 12 assumes an open condition where not only is the concave 28 accessible for inspection and servicing, but also the entire area of both sections 40 and 42 of the grain pan becomes accessible for inspection, cleaning, or such repair as may conveniently be made with the grain pan in situ. A more complete access to the interior of the body portion may be had by simply lifting the grain pan section 42 from the inclined dotted line position of FIG. 1 and completely removing the same as shown in FIG. 4. Because of the fact that the movable front section 42 functions in the manner of a door and is capable of moving between an upper "closed" position wherein access to the interior of the body portion 12 of the harvester is precluded, and an "open" lowered position where such access is possible, the section 14 has been referred to herein as a door section. This articulation of the grain pan and its capability of partial removal without the aid of tools constitutes the principal and essential feature of the present invention.

Still referring to FIGS. 2, 3 and 4, the present grain pan assembly 32 does not differ widely in its general characteristics from a conventional grain pan assembly in that it is of shallow tray-like configuration and involves in its general organization a pair of longitudinally extending side rails 46 and 48 between which the grain pan section 42 is fixedly supported and the front door section 42 is releasably supported. The two sections 40 and 42, when in their operative or normal coplanar relationship, assume the functional and dimensional characteristics of a conventional rectangular grain pan, the fixed section 40 representing an unmodified rear area of a conventional directionally stepped grain pan bottom and being provided with conventional pan dividers 50, grain baffles or shields 52 and other well-known instrumentalities which bear no direct relationship to the present invention and which therefore require no description herein. Both sections 40 and 42 are of full grain pan width, which is to say that they bridge the distance between the two side rails 46 and 48. The longitudinal extent of the fixed section 40 is preferably on the order of two-thirds of longitudinal extent of a conventional grain pan, the combined extent of the two sections being commensurate with that of a conventional grain pan. It will be understood however, that the relative lengths of the sections 40 and 42 may be varied within fairly wide limits but, ordinarily the fixed section 40 will be longer than the section 42 but, in any event, the combined lengths of the sections should be approximately the length of a conventional grain pan.

Referring additionally to FIGS. 5, 6 and 7, each side rail 44 and 46 is generally of outwardly facing channel shape design and includes an upper outwardly facing inclined flange 54 (FIG. 7) a lower lateral flange 56 and a vertical channel web 58. The usual rubber or other elastomeric sealing strip 60 extends along the flange 54 and is secured thereto by a clamping strip 62 which is held in place by nut and bolt assemblies 64. The inner edges of the clamping strips 60 overhang the inner edge of the flange 54 as clearly shown in this view and serve a function that will be made clear presently.

The rear fixed grain pan section 40 is supported between the side rails 46 and 48 on opposed pairs of shelf-forming brackets 65 (FIGS. 5 and 6). The extreme rear end of the grain pan section 42 is supported on a transverse angle piece or crossbar 66 which bridges the distance between the side rails 46 and 48 and has its ends welded or otherwise secured to a pair of opposed supporting plates 67 which are suitably mounted on the inside faces of the side rails. An elongated open top hinge bar 68 is secured to the front face of the crossbar 66 and, in combination therewith, establishes an open cradle or channel which removably receives therein the lower rolled rear edge 70 of a hinge leaf 72, such edge, in effect, constituting a hinge pin. The hinge leaf depends from the rear edge of the movable front grain pan door section 42 and is welded or otherwise secured thereto. The hinge bar 68 and rolled edge 70 constitute the aforementioned hinge connection 44 between the adjacent edges of the two grain pan sections 40 and 42.

The front door section 42 of the grain pan 34 is a counterpart of the rear section 40 and it similarly is provided with a directionally stepped pan bottom, together with pan dividers 74 which, when the section 42 is in its raised operative position, constitute, in effect, continuations of the pan dividers 50 of the fixed grain pan section 40 as shown in FIG. 1. The front door section 42 is supported above its rear edge by means of the aforementioned hinge connection 44 and the front edge of such section is releasably supported from the front ends of the two side rails 46 and 48 by means of a clamping assembly 80 (FIG. 5) which, as will be set forth in detail presently, consists of various transverse clamping strips and associated clamping bolt assemblies.

As shown in FIG. 7, the front door section 42 of the grain pan 34 is provided with longitudinal channel-like side members 82 (see also FIGS. 3 and 4) which, when the door section is in its raised operative position, lightly bear against the inner overhanging portions of the sealing strips 60 in sealing relationship. As shown in FIG. 6 when the door section 42 is lowered to its inclined position, the side edges of the same move away from the sealing strips 60, thus leaving the section suspending solely from the hinge connection 44 and largely withdrawn from the confines of the side rails.

Referring now to FIGS. 5, 6 and 7, the aforementioned clamping assembly 80 by means of which the door section 42 is releasably clamped in its operative raised position is comprised of a pair of reentrant obtuse angle flanges 84 which are provided on the forward ends of the side rails 46 and 48, together with a transverse obtuse angle plate 86 which is carried by the forward edge of the door section 42 and the opposite ends of which fit against the flange 84 of the two side rails when the door section is in its raised position. The inclined portions of the transverse wide angle plate 86 is secured by nut and bolt assemblies 88 to the inclined portions of the two wide angle flanges 84, while the horizontal portion of the plate 86 is similarly secured to the horizontal portions of such flanges 84 by nut and bolt assemblies 90. In order to capture the bolt components of the nut and bolt assemblies 88 and 90, wide angle retainer strips 92 are maintained spaced from the flanges 84 by spacer members 94 and are secured in place by nut and bolt assemblies 96. From the above description it will be apparent that when it is desired to lower the door section 42 of the grain pan to the "open" position in which it is shown in FIG. 6, it is merely necessary to remove the nut components of the assemblies 88 and 90, thus freeing the door section 42 for swinging movement about the transverse axis of the hinge assembly 44, the bolt components of these assembles remaining in position on the side rails as shown in this view.

As best shown in FIG. 5, the inclined portion of the wide angle plate 86 carries at its upper edge a transverse elastomeric sealing strip 98 which is secured in position thereon by nut and bolt assemblies 99. When the door section 42 is in its operative raised position, the side edges of this sealing strip 98 registers with the forward edges of the two sealing strips 62 on the side rails 46 and 48.

In FIG. 9 a slightly modified form of clamping assembly 180 for maintaining the door section 42 in its raised position is disclosed. Due to the similarity between this form of clamping assembly and the previously described clamping assembly 80, and in order to avoid needless repetition of description, similar reference numerals but of a higher order have been applied to the corresponding parts as between the disclosures of FIGS. 5 and 9. In the clamping assembly 180, the obtuse angle plate 186, sealing strip 198, and retainer strips 92 remain the same as the corresponding elements of the assembly 80, the only difference between the two forms of clamping assemblies residing in the fact that the nut and bolt assembly 88 of the assembly 80 is replaced by a combined nut and spacer member 189 which is welded to the retainer strip 192 and receives a bolt 191 therein when the door section 42 of the grain pan is in its raised and clamped position. Thus, in the latter modified form of clamping assembly 180 the bolt 191 is removable from the assembly whereas, in the assembly 80, the associated nut is removable.

In FIG. 10 a further modified form of clamping assembly 280 for maintaining the door section 44 raised is shown. Again, in order to avoid needless repetition of description, identical reference numerals have been applied to the corresponding parts as between the disclosures of FIGS. 9 and 10 respectively. In this latter form of the invention, the retainer strip 201 serves only the nut and bolt assembly 190 while the spacer member 189 of the assembly 180 is replaced by a nut 200 which is welded to the associated obtuse angle flange 184, such nut serving to receive a clamping bolt 202. Otherwise the clamping assembly 280 remains substantially the same as the clamping assembly 180.

It will be understood that when the harvester 10 is in operation the entire grain pan assembly 34 is reciprocated in the usual manner of grain pan operation. Accordingly, as shown in FIGS. 5 and 6 an incidental disclosure of the grain pan shaker shaft 110 and its associated pitman drive arm 112 has been made. Since the means for oscillating the grain pan assembly bears no direct relation to the present invention it is not deemed necessary to further illustrate or describe such means, other than to point out that the shaker shaft extends horizontally between the two side rails 44 and 46 and has its ends supported in bearing brackets 114 mounted on such side rails, while the pitman drive arm 112 is actuated under the influence of an eccentric drive mechanism (not shown). It will be appreciated therefore that when the forward door section 42 of the grain pan 34 is in its raised position with the clamping assembly 80 in its fastened condition, the present grain pan assembly functions substantially in the manner of a conventional grain pan assembly, the shaker shaft 110 functioning to reciprocate the grain pan bodily as a unit.

At such time as it is desired to inspect or clean the grain pan, or provide access to the concave 28 for cleaning purposes, the two nut components of the assemblies 88 and 90 (in the case of the form shown in FIG. 5) may be removed, whereupon the forward grain pan section 42 or 142, as the case may be, may be allowed to fall by gravity to its lowered position as shown in FIGS. 3 and 6, the door section swinging about the axis of the hinge assembly 44 in the manner previously described. For a more complete access to the concave 28, complete removal of the door section 42 may be effected by first lowering the same to the position of FIG. 6 as set forth above and then lifting the section bodily upwardly so as to withdraw the rolled edge 70 of the hinge leaf 72 from its cradled position in the channel provided for it by the hinge bar 68, after which the door section may be pulled from the forward end of the harvester. Replacement of the door section 42, or substitution of a different door section is accomplished by a reversal of this procedure.

It is contemplated that, according to the invention, different types of door sections 42 may be used in conjunction with the fixed grain pan section 40 as for example, perforated or other special sections. Such sections will, of course, be provided with a hinge leaf similar to the hinge leaf 72 along its rear edge and a wide angle plate similar to the angle plate 86 along its forward edge for cooperation with the angle flange 84 on the side rails 46 and 48.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In a combine harvester of the type having crop harvesting instrumentalities, in combination, a housing enclosing threshing and cleaning apparatus and having a forward material receiving opening, said threshing apparatus including a threshing drum and a cooperating concave in the vicinity of said material receiving opening, said cleaning apparatus including a grain pan assembly disposed below the level of said concave and including a two-part articulated grain pan proper consisting of two grain pan sections disposed in edge-to-edge relationship and including a generally horizontal rectangular fixed rear section and a rectangular movable forward door section mounted for swinging movement about a transverse horizontal axis in the vicinity of the forward edge of said fixed section between a raised position wherein it lies in the general horizontal plane of said latter section and, in effect, constitutes a continuation thereof, directly underlies said concave in close proximity thereto, and extends across said material receiving opening, and a lowered downwardly inclined position wherein it exposes its upper surface and also exposes the concave, means for releasable securing said movable forward door section in its raised position, said grain pan assembly further includes a pair of parallel elongated side rails between which said fixed grain pan section extends in bridging relationship, a transverse crossbar extending between said side rails in the vicinity of the juncture region between said grain pan sections, hinge means connecting the rear proximate edge of said movable forward door section to said crossbar, said hinge means comprises an elongated hinge bar secured to said crossbar, said hinge bar establishing an upwardly facing channel, and a hinge pin disposed on the rear transverse edge of said forward door section and removably seated within said channel whereby, when said releasable securing means is released, the door panel may be raised bodily vertically and thus released from the grain pan assembly.

2. In a combine harvester, the combination set forth in claim 1, wherein said hinge bar is coextensive with a major portion of the crossbar and the hinge pin is coextensive with said channel.

3. In a combine harvester of the type having crop harvesting instrumentalities, in combination, a housing enclosing threshing and cleaning apparatus and having a forward material receiving opening, said threshing apparatus including a threshing drum and a cooperating concave in the vicinity of said material receiving opening, said cleaning apparatus including a grain pan assembly disposed below the level of said concave and including a two-part articulated grain pan proper consisting of two grain pan sections disposed in edge-to-edge relationship and including a generally horizontal rectangular fixed rear section and a rectangular movable forward door section mounted for swinging movement about a transverse horizontal axis in the vicinity of the forward edge of said fixed section between a raised position wherein it lies in the general horizontal plane of said latter section and, in effect, constitutes a continuation thereof, directly underlies said concave in close proximity thereto, and extends across said material receiving opening, and a lowered downwardly inclined position wherein it exposes its upper surface and also exposes the concave, and means for releasably securing said movable forward door section in its raised position, said grain pan assembly further includes a pair of parallel elongated side rails between which said fixed grain pan section extends in bridging relationship, a transverse crossbar extending between said side rails in the vicinity of the juncture region between said grain pan sections, hinge means connecting the rear proximate edge of said movable forward door section to said crossbar, an elastomeric sealing strip mounted on the upper edge of each side rail and coextensive with the latter, a transverse plate mounted on and coextensive with the forward distal edge of the forward door panel, and an elastomeric sealing strip mounted on said transverse plate, the end edges of said latter sealing strip making mating sealing engagement with the forward end edges of the sealing strips on the side rails in rectilinear fashion when the door section is in its raised position.

4. In a combine harvester, the combination set forth in claim 3, wherein the sealing strips on said side rails overhang both the inner and the outer sides of such side rails, and the side margins of the door section underlie the overhanging inner edges of such sealing strips in face-to-edge sealing relationship when the door section is in its raised position.

5. In a combine harvester, the combination set forth in claim 4, wherein the means for releasably securing the movable door section in its raised position comprises a flange on the forward end of each side rail and against which said transverse plate on the forward distal edge of the door panel bears when the door panel is in its raised position, and a nut and bolt assembly cooperating with each flange and serving to clamp the flange and transverse plate together in face-to-face relationship.

6. In a combine harvester, the combination set forth in claim 5, wherein the flange on the forward end of each side rail is of obtuse angle configuration in transverse cross section and presents horizontal and inclined planar flange portions, the plate likewise is of commensurate obtuse angle configuration, the opposite end regions of the plate fit against the flanges in contiguous nested relationship, and nut and bolt assemblies serve to clamp the corresponding contiguous flange portions together.

7. In a combine harvester, the combination set forth in claim 6, wherein a retainer strip is bolted to each flange and overlies the bolt components of the nut and bolt assemblies and serves to capture the same on the flanges.

8. In a combine harvester, the combination set forth in claim 6, wherein a retainer strip is bolted to each flange and overlies the bolt component of one of said nut and bolt assemblies, and the nut component of the other nut and bolt assembly is welded to said obtuse angle plate.

* * * * *